United States Patent [19]
Sieber

[11] Patent Number: 5,394,695
[45] Date of Patent: Mar. 7, 1995

[54] WAVE POWERED ENERGY GENERATOR

[76] Inventor: J. D. Sieber, 10 Elena Court, Georgetown, Ontario, Canada, L7G 4Z2

[21] Appl. No.: 995,119
[22] Filed: Dec. 22, 1992

Related U.S. Application Data

[63] Continuation-in-part of Ser. No. 679,106, Apr. 2, 1991, Pat. No. 5,179,837.

[51] Int. Cl.$^6$ .............................................. F16D 31/02
[52] U.S. Cl. ....................................... 60/398; 290/53; 417/331
[58] Field of Search ....................... 417/331, 337, 266; 60/650, 682, 659, 398, 497, 498; 290/53

[56] References Cited

U.S. PATENT DOCUMENTS

| 644,093 | 2/1900 | Place | 417/331 |
|---|---|---|---|
| 848,629 | 4/1907 | Burkholder | 417/266 |
| 3,163,985 | 1/1965 | Bouyoucos | 60/398 |
| 3,715,887 | 2/1973 | Weatherly et al. | 60/650 |
| 4,076,463 | 2/1978 | Welczer | 417/331 |
| 4,466,244 | 8/1984 | Wu | 60/398 |
| 4,560,884 | 12/1985 | Whittecar | 290/53 |
| 4,705,460 | 11/1987 | Braun | 417/266 |
| 4,754,157 | 6/1988 | Windle | 417/331 |

FOREIGN PATENT DOCUMENTS 0287506 of 1913 Germany .......................... 417/266

Primary Examiner—John T. Kwon
Assistant Examiner—Mark Sgantzos
Attorney, Agent, or Firm—Rogers & Scott

[57] ABSTRACT

A method and device are provided for generating energy from the motion of waves. Fluid is conveyed through stages in series, each stage having at least one unit, and each unit incrementally increasing the energy available. The fluid passes under the forces created by differential pressure within that unit and energy from a preceding stage is input into the succeeding stage in series. Preferably, each unit includes a first member and an associated second member, the first member being immersed in or floating on the surface of a body of water, the first member rising and falling with the rise and fall of wave motion, and the second member being anchored. Energy is created as the result of the relative movement between the first and second members as the fluid passes through a unit. The fluid may then be used to drive turbines and electric generators or other energy conversion devices.

26 Claims, 5 Drawing Sheets

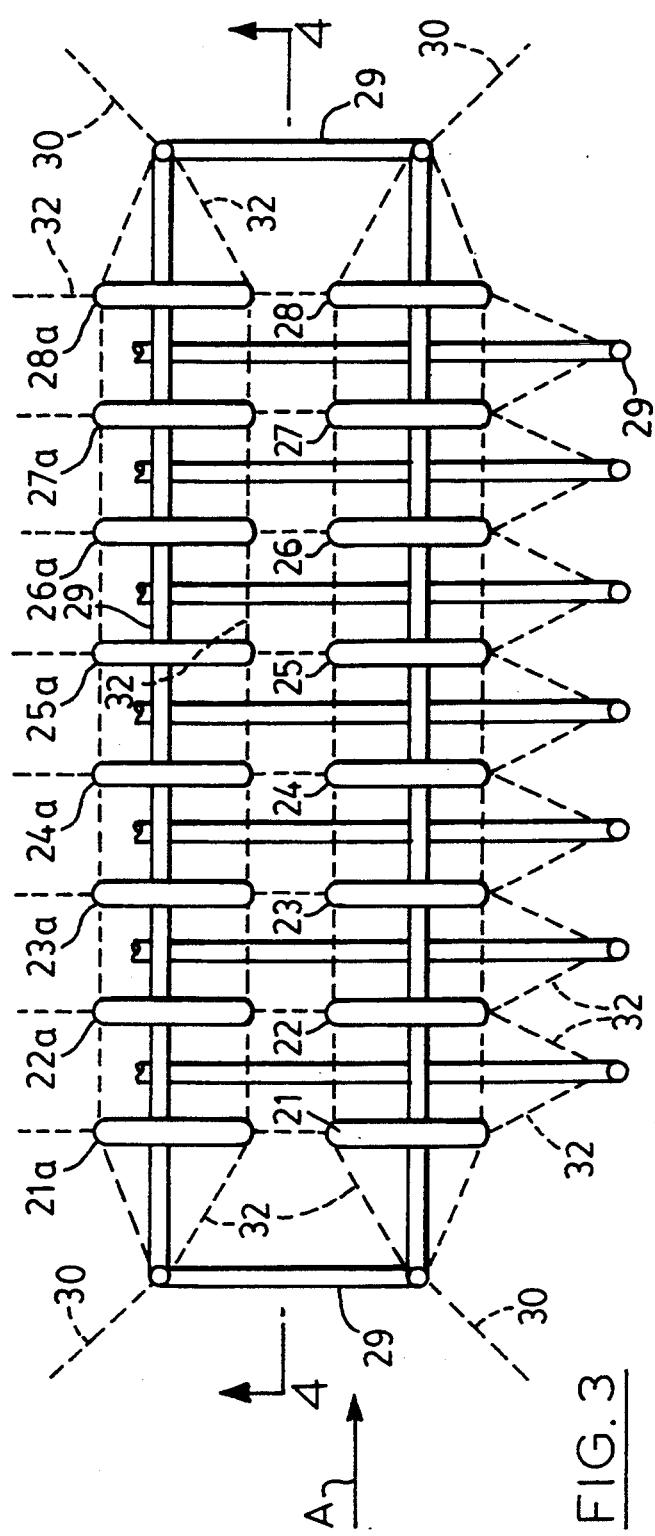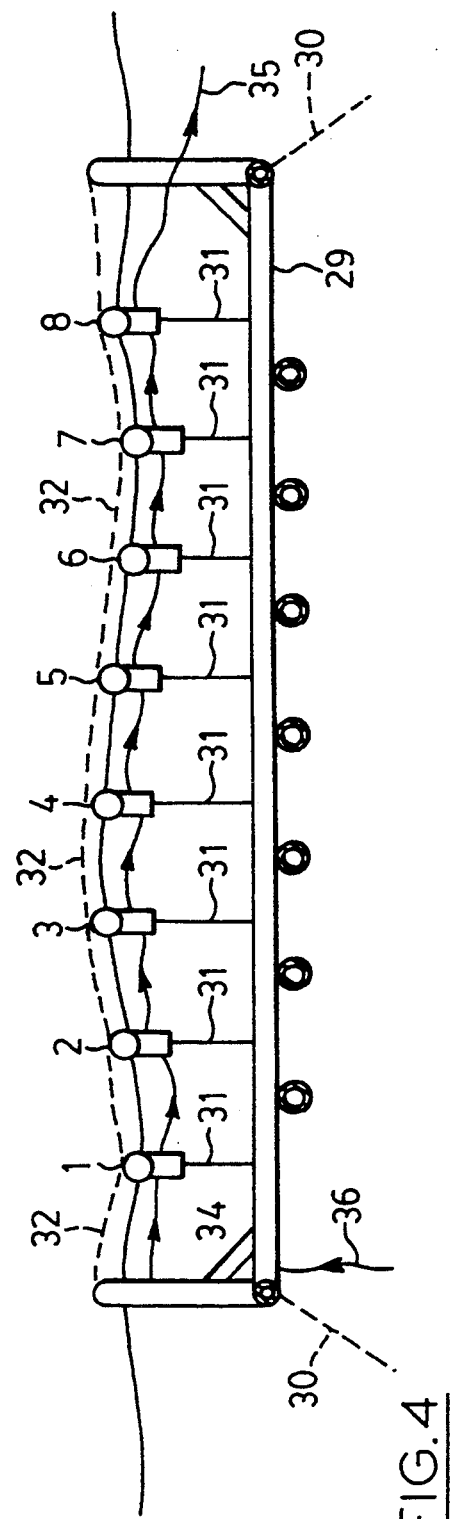

WAVE POWERED ENERGY GENERATOR

This application is a continuation-in-part application of Ser. No. 07/679,106, filed on Apr. 2, 1991, now U.S. Pat. No. 5,179,837.

BACKGROUND OF THE INVENTION

The invention described herein relates to a method and apparatus for generating energy from the motion of waves by conveying a fluid such as a common gas or a liquid through a series of at least two stages to accumulate energy for use in driving a prime mover.

Electrical energy for general use is being generated primarily by natural water flow, by burning fossil fuels and by nuclear generation. These methods have associated environmental problems and in the case of fossil fuels, an unacceptable depletion rate. This has led researchers to investigate the possibilities of harnessing energy from wave action and from wind. This invention is related to the generation of energy from naturally occurring wave action.

A great variety of approaches have been proposed to generate energy from waves. One common approach is to utilize a float which rides up and down with wave motion guided by a fixed or anchored member which remains relatively stationary. An air compression cylinder is introduced between the float and the anchored member, together with associated intake and output conduits and check valves in order to store energy in compressed air which is accumulated as the float rises and falls with the wave action. Variations to such devices have been made to pressurize liquids or to pump water to fill an elevated water reservoir on shore. The energy stored in the pressurized fluid, air or water is then used to drive a conventional machine such as a turbine/generator set to supply electrical energy.

One example of a prior art approach to the use of such arrangements is to be found in U.S. Pat. No. 644,093 to Place (issued Feb. 29, 1900). This older patent describes a conventional marine air compressor which also includes a submerged reservoir. The submerged reservoir is positioned below the float and air compression cylinder, and remains relatively stationary in deeper waters away from the active wave surface. The reservoir is anchored to the ocean floor and is connected in line between the air compression cylinder and the compressed air output conduit. A fluid filled dampening piston-cylinder arrangement is provided within the reservoir to compensate for the rise and fall of the water surface between high and low tide in ocean applications.

Another example is found in U.S. Pat. No. 4,754,157 to Windle (issued Jun. 28, 1988) which describes several further variations upon conventional float type wave energy devices, including means to extract energy from both the rise and fall of the float. Windle also teaches the use of a number of such devices connected in parallel to fill a water reservoir.

Single float type units are also described in U.S. Pat. Nos. 1,665,140 to Master, 2,487,228 to Kriegel, 3,515,889 to Kammier, 4,203,294 to Budal et al and 4,560,884 to Whittecar. Multiple parallel arrays of such units are desribed in U.S. Pat. Nos. 1,264,737 to Woods, 4,204,406 to Hopfe, 4,408,454 to Hagen et al, and 4,622,473 to Curry.

Conventional single unit devices and multiple arrays of units conventionally connected in parallel suffer from the disadvantage that a relatively high minimum amplitude of wave must be encountered before the pressure in the cylinder reaches a level at which useable pressurized fluid is generated. As a result, waves having an amplitude below such a minimum do not generate any energy. The minimum amplitude is determined by the design of the air compressing cylinder, and this disadvantage is present in both single unit devices and multiple unit arrays of the conventional methods and devices.

To clearly illustrate this point the following example is presented.

| Assuming: intended | intake pressure | $p_o = 14$ psi |
|---|---|---|
| | design output pressure | $p_f = 250$ psi |
| | air cylinder internal diameter | $d = 10$ in |
| | air cylinder intake chamber length | $l = 60$ in |
| | initial volume | $V = \frac{1}{4}\pi d^2 l$ |
| | final volume | $V_f = V \cdot P_o/p_f = \frac{1}{4}\pi d^2 l_f$ |
| | since | $PV$ = constant at a constant temperature |
| | solving for | $l_f = l \cdot P_o/P_f$ = 3.36 inches |

In summary, before compressed gas of 250 psi opens the check valve and exits the chamber, the piston must move over 56 inches or 95% of its full stroke. From the above example, it can be seen that the larger the pressure difference $P_d$ between intake pressure $P_o$ and output pressure $p_f$ the larger the wave and longer the air cylinder chamber length must be before any compressed gas leaves the device (as represented mathematically $l_f = l_o p_o/P_f$).

As in the above example, the outlet of a chamber has a check valve which will only open to exhaust compressed gas when the pressure of the gas is equal to or greater than 250 psi. If a wave is encountered which is less than the minimum amplitude (56.64 inches) the gas is pressurized to a level less than 250 psi and there is no output of compressed gas. In effect the potential energy stored in the compressed gas generated at less than the final design pressure is not captured because the outlet valve does not open. The potential energy of the compressed gas below 250 psi is dissipated as the wave subsides and the gas decompresses.

Lowering the design pressure will increase the volume of compressed air generated and will capture energy from waves of lesser amplitude (i.e. if $P_f = 125$ psi then $l_f = 6.72$ inches; if $P_f = 50$ psi then $l_f = 16.8$ inches). This design choice is of little practical value because with compressed gases of lower pressure, higher volumes must be conducted and low pressure gases are of lesser value in driving turbines. Also, the decrease in pressure output is not offset by the decrease in minimum wave amplitude (i.e. from $P_f = 250$ to 50 psi the minimum wave amplitude changes from 56.64 inches to 43.20 a net change of only 13.44 inches or 24%).

The conventional parallel arrays of compression units do not address this disadvantage and the total volume of energy captured is increased only by increasing the number of compression units. This solution is not cost effective given the capital cost of building an array of units and the operational cost of maintaining them.

It is therefore desirable to provide a device which can capture energy from a wide range of wave amplitudes.

It is also desirable that such device produce compressed gas or pressurized liquid in sufficient volume and at a high enough pressure to make the device economically viable.

SUMMARY OF THE INVENTION

The invention described herein addresses the disadvantages of the conventional devices and methods and provides for generating energy from waves in a novel and useful manner.

According to one aspect of the invention, there is provided apparatus for pumping a fluid to increase the energy available in the fluid to drive a prime mover. The apparatus has a plurality of stages coupled one to another in series to supply fluid from one stage to the next stage. Each of the stages moves a greater volume of fluid per passage of a wave than the next stage, each of the stages includes at least one unit having first and second members coupled to one another for relative movement when the unit is subjected to wave action. Pump means is coupled to the first and second members to receive fluid and to pump the fluid to said next one of the stages.

In another of its aspects the invention provides a method of storing energy using pumping stages arranged in series.

BRIEF DESCRIPTION OF DRAWINGS

In order that the invention may be clearly understood, embodiments of the invention will be described by way of example with reference to the accompanying drawings in which:

FIG. 3 is a plan view of an array of sixteen pressurization stages arranged in two groups of eight series connected units moored to a hollow tubular frame which is buoyant to a slight degree and is anchored to the sea floor;

FIG. 4 is a view along line 4—4 of FIG. 3;

BEST MODE OF CARRYING OUT THE INVENTION

Figure 1:
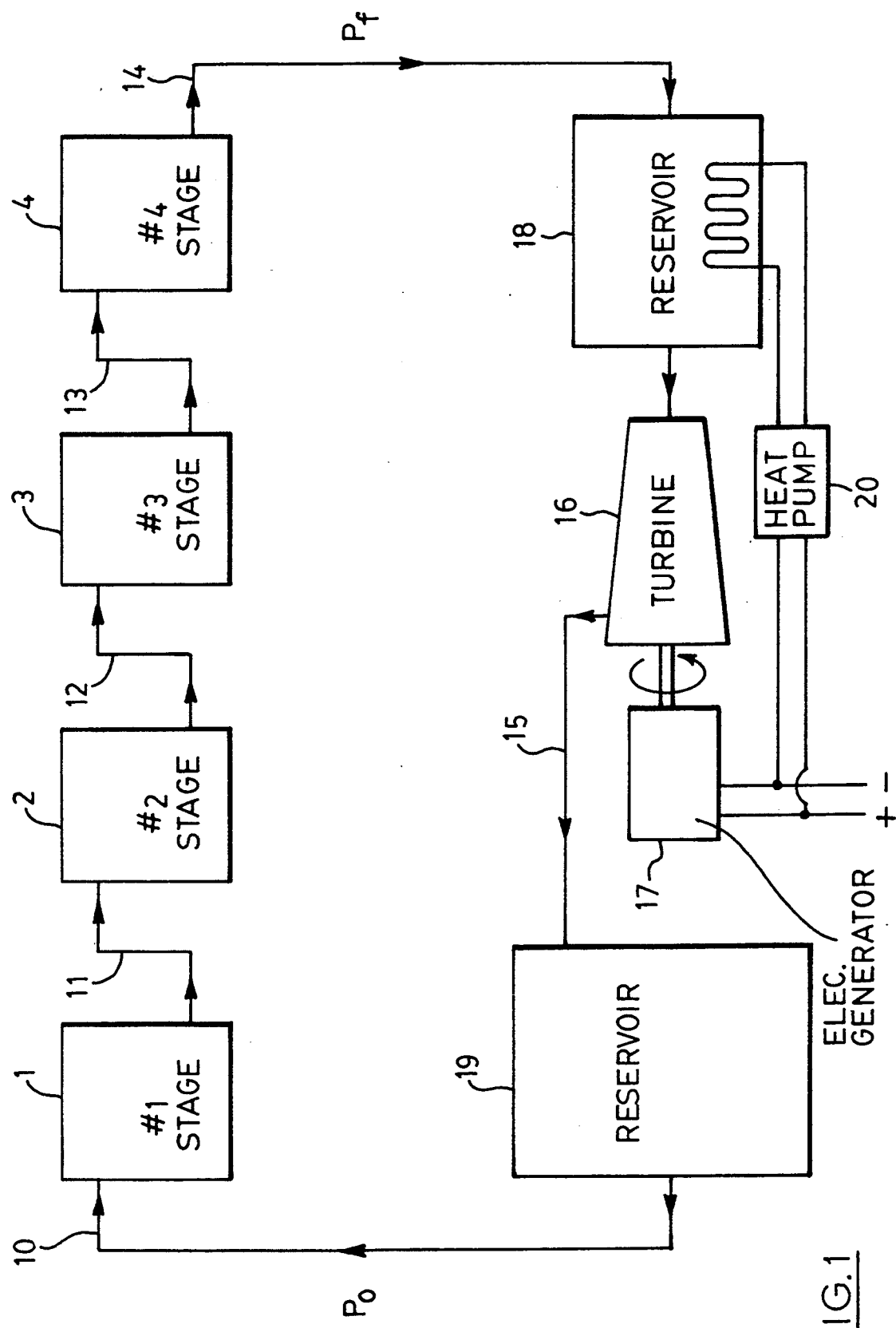
FIG. 1 is a schematic diagram of a closed loop system according to the invention having four different pressurization stages connected in series.

Referring to FIG. 1, the general scheme of the invention is shown in a closed loop circuit, although fluid may be input at the initial stage and exhausted after exiting the turbine if desired. The exemplary system shown in FIG. 1 has four stages for ease of illustration and it will be understood that the choice of number of stages is a design choice depending upon various design parameters as will be explained. The invention is applicable to any fluid (i.e. gas or liquid) although the mechanical structures will change depending on the characteristics of the fluid. A first embodiment will be described with reference to a gas compression device and later a second embodiment which pumps liquid will be described.

In the first embodiment, gas is conveyed through the four stages in series so that the gas pressure is incrementally increased as the gas passes through the stages. The gas enters the initial stage via intake conduit 10 at an initial pressure $P_o$ and leaves the final stage 4 via outlet conduit 14 at a pressure $P_f$. The output of each of the preceding stages 1, 2, and 3 is the input for the respective succeeding stages 2, 3, and 4 via intermediate conduits 11, 12 and 13. Consequently, because of this series arrangement, the gas pressure in each stage is incrementally increased and the volume from one stage to the next is reduced as the pressure builds according to the relationship $P_{out} \times V_{out} = P_{in} \times V_{in}$. This means that for the system as a whole, if the final pressurized volume $V_f$ is at an elevated pressure $P_f$, the air entering the system at atmospheric pressure $P_o$ must have a volume $V_o$ stated by the formula $V_o = P_f V_f / P_o$. In other words, the requirement for air at the inlet to the system is many times the volume leaving the system in a given time. This requirement can be met by using a series of gas compression devices of different dimensions so that the volume swept in each stage is less than that of a preceding stage or by designing each stage to be made up of multiple devices of the same or different dimensions and joining the devices in each stage to one another in parallel.

The above criteria will now be used in an example. Suppose it is required to design a system in which the pressure is doubled at each stage. Also, the output volume from one stage is equal to the input volume of the succeeding stage, and the output volume of a stage is half the input volume (because the pressure is to be doubled). If a single compression device is used in each stage, and the compression device is a piston housed in a chamber, the ratio of successive swept volumes must be equal to 2:1. Since wave action is considered constant, the stroke is constant so the ratio of volume is proportional to the ratio of piston areas (see Table 1).

TABLE 1

| Stage | Diam. Squared | Input Pressure | Output Pressure |
|---|---|---|---|
| #1 | $D_o^2$ | Po | Po x 2 |
| #2 | $\frac{1}{2} D_o^2$ | Po x 2 | Po x 4 |
| #3 | $\frac{1}{4} D_o^2$ | Po x 4 | Po x 8 |
| #4 | $\frac{1}{8} D_o^2$ | Po x 8 | Po x 16 |

Figure 2:
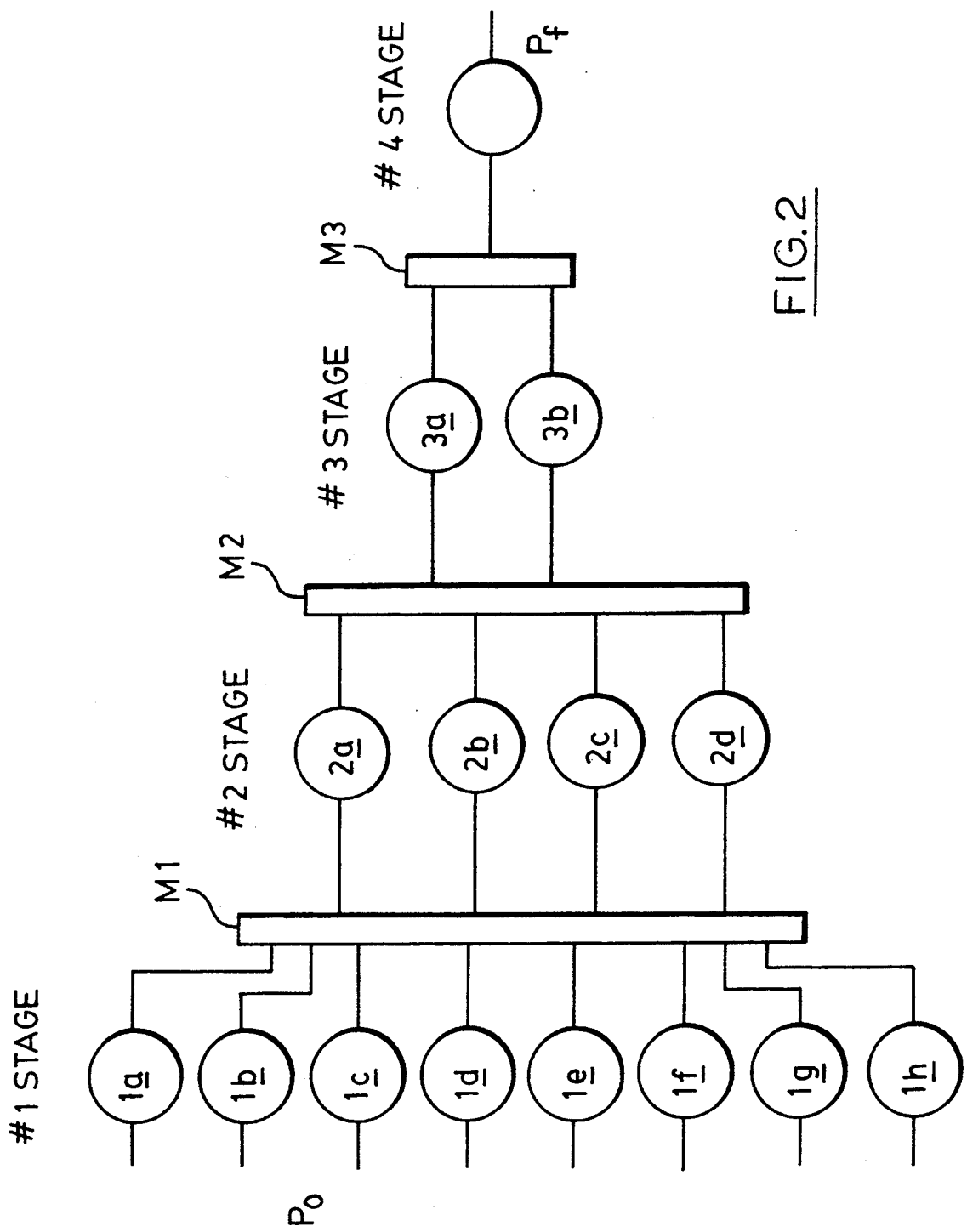
FIG. 2 is a schematic diagram showing one arrangement of the four pressurization stages connected in series, the first three stages having multiple pressurization units connected in parallel and feeding ultimately to a single unit forming the fourth stage.

Consider now the same example but using identical compression devices at each stage. As shown in FIG. 2, the stage #1 would have eight equally dimensioned devices 1a to 1h feeding in parallel to a manifold M1. This would supply stage #2 made up of four more devices 2a to 2d which would feed through another manifold M2 to the third stage of two equivalent devices 3a, 3b. These in turn would feed a single device at stage #4. In this way, devices of the same dimensions (diameter and chamber length) can be used to provide the necessary changes in swept volume so that the pressure is doubled at each stage.

It will be understood that the above examples are for ease of understanding only. The pressure at each stage need not be doubled and the dimensions of the compression chamber and piston in each stage would be varied as necessary.

Looking again at FIG. 1, the output gas from the system has a pressure $P_f$ which can be used at energy conversion means. In the embodiment illustrated in FIG. 1, conversion is done at a gas driven turbine 16 coupled to an electric generator 17. A turbine intake reservoir 18 accumulates pressurized gas between the last stage 4 and the turbine 16. Appropriate valve controls (not shown) will be employed to enable the system to build up to the pressure $P_f$ needed to optimize turbine operation. The reservoir would have a conventional blow off valve for safety reasons.

The spent gas from the turbine is output via conduit 15 at a relatively low pressure and may be stored in a turbine output reservoir 19 before being input to the initial stage 1 via intake conduit 10 thereby circulating the gas in a closed loop. Of course provision must be made for topping up the system to ensure gas is always available at the first stage.

The reservoirs 18 and 19 provide for balancing and initializing the system pressures for optimal operation of the turbine 16 and pressurization stages 1, 2, 3, and 4. To optimize energy generation the energy stored in the pressurized gas may be supplemented by heating the gas with a heat pump 20 feeding a heat exchanger in the intake reservoir 18.

A schematic representation of the use of units in series is show in FIGS. 3 and 4. Two strings of units 21 to 28 and 21a to 28a are tethered in a single array which represents the end array of a plurality of such arrays as will be explained. Each unit 21 to 28 feeds a succeeding unit having a smaller swept volume until the output from unit 28 represents the smallest swept volume and highest pressure. This output, and output from other stages such as 21a to 28a, is fed to conduits such as conduit 35 and hence to an accumulator or reservoir such as reservoir 18 (FIG. 1). After driving the turbine, gas returns via conduit 36 into a grillage 29 which acts as reservoir 19 (FIG. 1) and then re-enters the string by conduit 34.

The grillage or frame 29 is a hollow structure made up of tubes sealed to contain gas. The frame 29 is anchored by cables 30 and each unit is anchored by vertical cables 31 to the frame 29 below. A network of mooring lines 32 extend from the units to the frame 29 projecting from the water. In this way the complete array is maintained in a relatively fixed latitude and longitude and each of the stages is maintained in position relative to the frame 29 while free to move in the waves at the ocean surface.

The array shown in FIGS. 3 and 4 is an end one of a plurality of such arrays arranged in parallel. To this end, there are lateral mooring lines 32 on one side joined to frame 29, and on the other side, mooring lines 32 to the neighbouring units in the next array.

The prevalent wave direction is indicated by arrow A in FIG. 3. It is apparent that the mooring lines 32 are arranged so that the operations of the various stages are independent.

Figure 5:
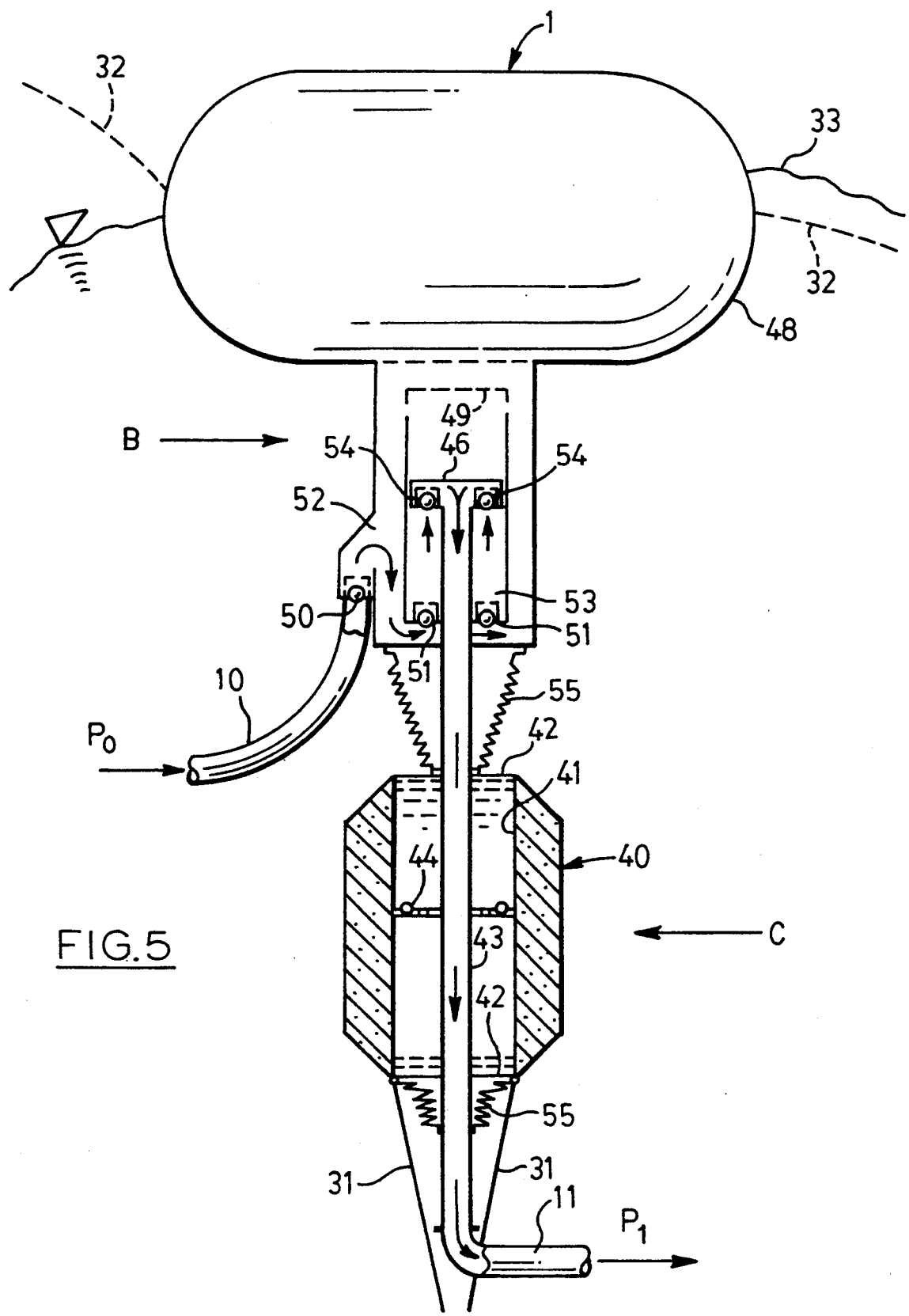
FIG. 5 is a detailed sectional side view showing the internal components of a single pressurization unit.

Referring to FIG. 5, the construction and operation of each pressurization unit is illustrated. For the purpose of illustration only, the reference numerals relate to a unit in the first stage 1. As discussed, different input and output pressures will dictate variations in piston and chamber dimensions.

Gas at the initial pressure $P_o$ is input into the stage 1 or pressurization unit 1 via intake conduit 10 and is output to the succeeding stage 2 conduit 11 at an incrementally increased pressure, $P_1$.

The unit 1 is tethered by cables 31 to the grillage 29 and consists generally of a first or upper member B and a second or lower member C. The first member is buoyant and free to move vertically under the motion of the waves and guided by a heavy shaft 43. This shaft is located in the second member C and although it can move relative to the member C (as will be explained) it is essentially fixed during the motion of the first member B as it rides a wave.

The member C includes a tide accommodating submerged float 40 tethered by the cables 31 to the grillage 29. The float has a central cylindrical chamber 41 capped at both ends by caps 42 and the shaft 43 is slidably guided by the caps to rise and fall slowly with the tide. This motion is damped by a rigidly attached baffle plate 44 on the shaft 43. The baffle plate 44 is perforated in the embodiment shown but could simply have a small gap separating it from the chamber walls. The baffle plate 44 assembly is surrounded by liquid (preferably of higher viscosity than water) within the chamber 41. As will be explained in detail below, the submerged float 40 assembly allows the shaft 43 to gradually rise and fall with the tide. This motion results from a piston 46 engaging the upper and lower ends of a compression chamber 47 in the upper member B under the action of the waves in changing water depth. The submerged float 40 also acts as a shock absorber between the anchor cables 31 and the floating upper portion of the pressurization unit 1, thereby reducing impact loads upon the cables 31.

Upper member B includes a surface float 48 which is at least partially immersed in the body of water 33 and rises and falls with the rise and fall of the water level. The surface float 48 is preferably a hollow pressure vessel which serves to store compressed gas acting as a reservoir and to ensure that on each stroke of the piston 46 within the compression chamber 47 there is sufficient volume of gas supplied to optimize the energy captured from each wave.

For ease of illustration the embodiment shown in FIG. 5 captures compressed gas only upon a rising wave, however, it will be apparent that conventional valve and manifold arrangements may be devised to capture compressed gas resulting from a falling wave as well, thereby making the piston-chamber device a double-acting cylinder well known to those skilled in the art.

When the piston 46 is at its fully extended intake position, the piston 46 is adjacent to the upper end 49 of the compression chamber 47. The chamber 47 has filled with gas supplied from float 48 via manifold 52 so that input pressure is essentially the same as that stored in the float 48. The chamber fills as the drop in pressure created by the falling surface float 48 draws gas through check valves 50 and 51 and the surrounding gas supply manifold 52. As the surface float 48 rises with an incoming wave the gas pressure increases as the piston 46 and the bottom end 53 of the compression chamber 47 come towards one another. When the gas in the compression chamber 47 is pressurized to the final output design pressure for the particular stage (see Table 1 for examples), upper check valves 54 in the hollow piston 46 open to allow the pressurized gas to flow into the hollow shaft 43 and through conduit 11 to the succeeding stage (2 in this example). Perforations in the upper end 49 of the compression chamber 47 and in the bottom of the surface float 48 ensure that gas is supplied in sufficient quantity at the ambient pressure existing in the reservoir without excessive friction losses in pressure.

As the float 48 moves, the pressure in the chamber 47 will tend to cause the shaft 43 to move. However, because the submerged float 40 exerts a restraining force through the baffle plate 44 the piston shaft 43 remains relatively stationary as the surface float rides on the waves.

It will be apparent that the above described invention is adaptable to use any common gas such as air or nitrogen gas. In a closed loop series arrangement dry nitrogen gas is preferred due to its relative abundance and low price, negligible environmental impact and non-corrosive qualities.

It should be noted that the higher the increase in pressure between stages, the more energy each device will require for compression if each device uses the same piston diameter. There is a maximum buoyant force available from the wave which is dictated to some extent by the height. The surface float must be proportioned to sit between the waves in order to move up and down with the waves. If the float is too large it will straddle adjacent waves and its action will be attenuated. An elongate float extending parallel to the wave ridges may be desirable. The diameters of the pistons such as piston 46 should be designed so that the pressure multiplied by the active area of the piston is less than the available buoyant force. Of course if the pressure is too large or the buoyant force too small, an impractically small piston diameter may be required. This would yield undesirable volume being pumped and the units should be re-designed to either decrease pressure or increase the available buoyant force.

Various arrangements for the number and dimensions of the devices in each stage are possible. Generally, the vertical movement or stroke of the upper member of a device can be considered constant for all devices in a stage because the devices are all affected by the same wave. There will be a minimum stroke to compress the gas to open the valve and to send it to the next stage. If the wave height is smaller than this minimum stroke, the device will not pump. There is a maximum stroke equal to the chamber length which when reached will move the piston so that its motion brings the submerged float into play. Different arrangements may have different minimum strokes. For example, when each successive stage has half as many devices, the minimum stroke is $\frac{1}{2}$ the chamber length for the example of doubling the pressure at each stage (as mentioned previously). However, if each successive stage has $\frac{1}{4}$ the devices, the minimum stroke is $\frac{3}{4}$ the chamber length. Therefore, if the effective wave height drops to $\frac{3}{4}$ the chamber length, the first arrangement will still pump volume (at a reduced amount) yet the second arrangement will not.

The above is all a matter of design criteria such as wave heights, final pressure, final volume and buoyancy forces. For instance, there may be a choice as to whether 4 devices having diameters of 33", 23", 17" and 12" is more economical to pump a given volume at a given pressure than 15 devices each of which has an 11" diameter set up in a series of 4 stages utilizing parallel manifolds.

Figure 6:
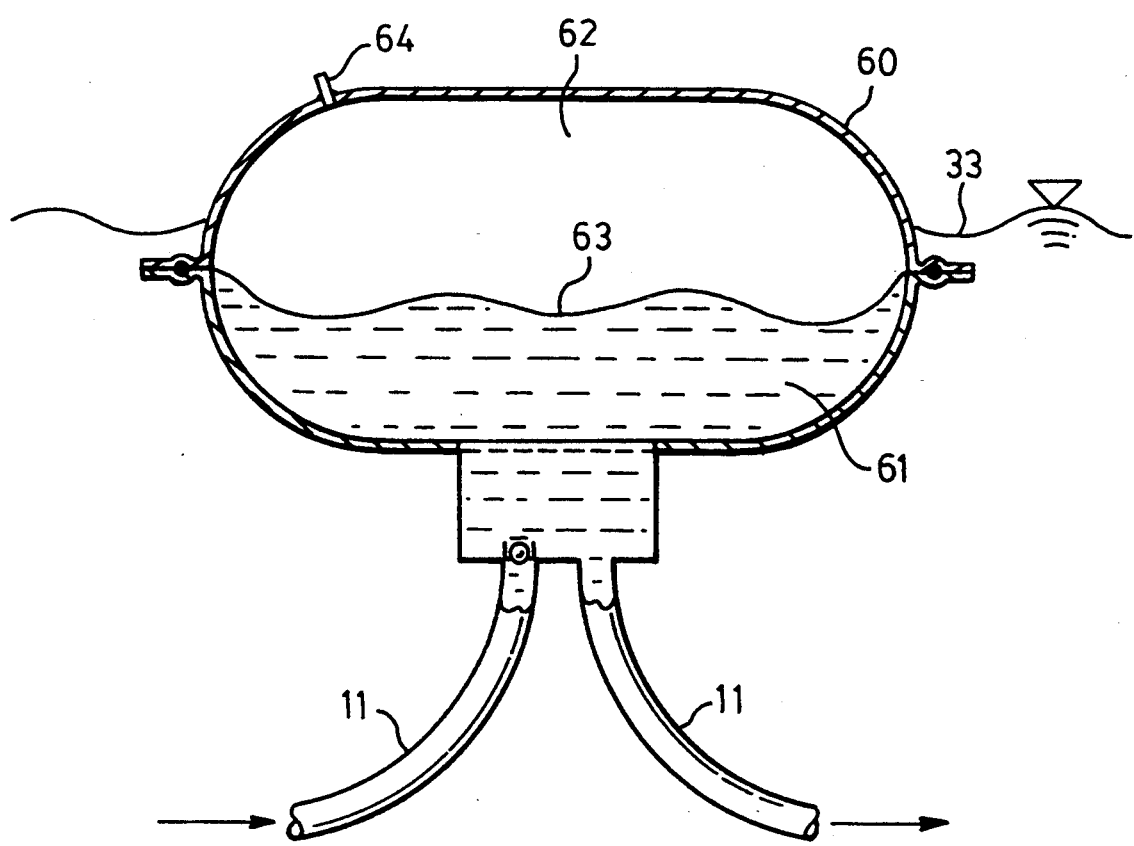
FIG. 6 is a diagrammatic sectional side view showing the internal components of a holding tank having a diaphragm separating pressurized air from water, the tank being for use in another embodiment.

To adapt the invention to pressurize a liquid such as water, intermediate holding tanks 60 shown in FIG. 6 are introduced between each stage. In the liquid filled embodiment, the surface floats 48 are sealed air filled vessels to retain buoyancy and are not in communication with the water supply manifold 52. The intermediate holding tanks 60 are moored to the frame 29 in a manner like the individual stages. However since they are only for holding liquid it is not necessary for them to maintain a large degree of buoyancy: they are free to ride the wave surface 33. A liquid chamber 61 communicates between the outlet of a preceding unit or stage and the inlet of a succeeding stage via conduits 11. A compressible gas filled isolated chamber 62 is separated from the liquid chamber 61 by a flexible diaphragm 63. Preferably the diaphragm 63 is formed as a sealed tube secured to the holding tank 60, at its midline. Air pressure is maintained in the isolated chamber 62 by introducing air through a valve 64. At initial start-up of operations, the shape of the diaphragm 63 conforms to the shape of the holding tank 60. Each holding tank 60 and diaphragm 63 is initially pressurized at a predetermined pressure for that stage. (For example, as described in Example #1; the holding tank 60 after the first stage 1 would be initialized at pressure $P_o$. The holding tank 60 after the second stage at $P_o \times 2$, etc.) As liquid is pumped into chamber 61, the air pressure in chamber 62 increases as does the liquid pressure in the chamber 61. The pressures in chambers 61 and 62 are always equal and maintain an equilibrium. Since air is compressible, the volume of chamber 62 decreases as the volume of the liquid in chamber 61 increases with an accompanying increase in pressure. If the inflow equals the outflow of liquid in operation the pressure remains constant.

The invention has been described showing exemplary units having floats 40 which are anchored. It should be understood that it is only required that this part of the device be kept at a relatively constant level in comparison with the rise and fall of wave motion. Other embodiments will become apparent to a person skilled in the art, the scope of the invention defined by the appended claims. In particular, stuctures capable of pumping fluid under the action of wave motion may be modified in accordance with the invention as described in order to build energy in a fluid sufficient to drive a prime mover such as a turbine. All such modifications are within the scope of the invention.

I claim:

1. Apparatus for pumping a fluid in response to natural wave action on a body of water such as an ocean, the apparatus comprising:

a plurality of stages coupled one to another in series to sequentially increase the pressure in a fluid and to move fluid progressively from a first of the stages to a last of the stages via the other stages, each of the stages including fluid storage means for containing the fluid;

each of the stages including at least one unit having a first member having a float for moving on the surface of the water for responding to wave action in the water and a second member anchored to remain essentially fixed vertically so that the wave action will cause vertical relative motion between the first and second members;

a plurality of positive displacement pumps, each of which has a discrete swept volume for each cycle of the pump, each pump being coupled to one of the units of one of the stages and operated by relative movement of the associated first and second members, and the pump being exposed to ambient pressure in the stage and operable by said relative movement to elevate the pressure of the fluid so that fluid is passed to the next stage at the ambient pressure of said next stage; and the pumps at each successive stage operating between a range of intake and outlet pressures greater than the corresponding pressures at the preceding stage and the total swept volume of the pumps at any one of the stages being smaller than that of the preceding stage whereby as the pressure of the fluid is increased at each successive stage, wave action will cause all stages to pump and to move fluid through the stages at increasing pressure and decreasing volume for use at the outlet from the last of said stages.

2. Apparatus as claimed in claim 1 in which all of the units are similar and operable to pump a predetermined volume of fluid.

3. Apparatus as claimed in claim 1 in which each stage consists of a single unit.

4. Apparatus as claimed in claim 1 in which each of the units pumps substantially the same volume of fluid for a given wave size.

5. Apparatus as claimed in claim 1 in which the fluid is gaseous and in which the storage means includes reservoirs at said stages to accumulate pressurized gas from each of the respective stages and to provide gas for the respective next one of the stages.

6. Apparatus as claimed in claim 1 in which the fluid is a liquid and in which the storage means includes reservoirs to accumulate liquid and to contain pressurized gas adjacent the liquid, each of the reservoirs being arranged to receive liquid from a respective one of the stages and to provide liquid for the respective next one of the stages.

7. Apparatus as claimed in claim 1, wherein the first member is at least partially immersed in the body of water, the first member rising and falling with the rise and fall of wave motion, the second member is anchored, said pump means engaging the first and second members for pumping the fluid as a result of the relative movement between the first and second members as the fluid passes under the force of differential pressure from an inlet to an outlet of the unit; and wherein the system further comprises conduit means communicating in series between the outlets of the units and the respective inlets of the units in succeeding stages for conducting fluid through the series of stages; and check valve means for conducting fluid in a single direction through the series of stages.

8. Apparatus as claimed in claim 7 wherein said fluid is a gas.

9. Apparatus as claimed in claim 8 wherein said gas is nitrogen gas.

10. Apparatus as claimed in claim 8 wherein the swept volume of the pumps at any one of said stages multiplied by the pressure of said gas at that stage is substantially constant.

11. Apparatus as claimed in claim 10 wherein said pump means comprises a piston housed within a mating chamber.

12. Apparatus as claimed in claim 11 wherein each of said stages has one unit only and the diameter of said piston squared decreases by a factor substantially equal to the increase in pressure of the gas for each stage.

13. Apparatus as claimed in claim 12 wherein said factor is a value preferably in the range of about 1.3 to 3.

14. Apparatus as claimed in claim 12 wherein each of said at least one unit per stage has substantially the same dimensions for said piston and said chamber and the number of units per stage is decreased by said factor for each successive stage.

15. Apparatus as claimed in claim 14 wherein said factor is preferably in the range of about 2 to 5.

16. Apparatus according to claim 7 wherein the relative motion of the first member of each unit operates independently of other units.

17. Apparatus according to claim 7 and further comprising a reservoir, the inlet to the reservoir communicating with the outlet from the final stage.

18. Apparatus according to claim 7 in which the storage means includes holding tanks located between each adjacent stage in the series, the holding tanks comprising:
a liquid chamber in communication between the outlet of a preceding unit and the inlet of a succeeding unit; and
a compressible gas filled isolated chamber separated from the liquid chamber by a flexible diaphragm.

19. Apparatus according to claim 1 and further comprising:
energy conversion means communicating with the final stage for converting the energy from the fluid to another form as the fluid passes through the energy conversion means.

20. Apparatus according to claim 19 wherein the energy conversion means comprises a turbine driving an electric generator.

21. Apparatus according to claim 19 and further comprising conduit means communicating between output from the energy conversion means and input to an initial stage of the system for circulating the fluid in a closed loop.

22. Apparatus according to claim 19 wherein the fluid is a gas, the system including heating means communicating with the fluid upstream of the energy conversion means for heating the fluid to increase the energy available in the fluid at said conversion means.

23. A method of generating energy from the motion of waves upon the surface of a body of water comprising the steps:
conveying a fluid through a series of at least two stages; and
incrementally increasing the pressure of the fluid as the fluid passes under the force of differential pressure between successive stages from an initial pressure input at an initial stage to a final pressure output from a final stage, the output from a preceding stage being input to the succeeding stage in series, each stage having at least one unit and the fluid in each unit being increased as a result of relative movement between a first and an associated second member of the respective unit, the first member being at least partially immersed in the body of water the first member rising and falling with the rise and fall of wave motion, the second member being anchored, the output from each stage being volumetrically smaller than the output from the preceding stage for a given wave action so that each stage is operating with the other stages continuously to decrease volume and increase pressure.

24. A method according to claim 23 further comprising the steps:
conveying the fluid at the final pressure from the output of the final stage to the inlet of energy conversion means; and
converting the energy stored in the pressurized fluid to another energy form as the pressurized fluid passes through the energy conversion means.

25. A method of according to claim 24 further comprising the steps:

conveying the fluid output from the energy conversion means to the input of the initial stage thereby circulating the fluid in a closed loop; and storing the fluid output from the final stage in a reservoir.

26. A method according to claim 24 in which the fluid is a gas and in which the method further comprises the step of heating the fluid upstream of the energy conversion.

* * * * *